(12) United States Patent
Wang et al.

(10) Patent No.: US 9,020,266 B2
(45) Date of Patent: Apr. 28, 2015

(54) METHODS AND DEVICES FOR PROCESSING HANDWRITING INPUT

(71) Applicants: Peking University Founder Group Co., Ltd., Beijing (CN); Peking University, Beijing (CN); Beijing Founder Electronics Co., Ltd., Beijing (CN)

(72) Inventors: Ying Wang, Beijing (CN); Lei Ma, Beijing (CN); Yingmin Tang, Beijing (CN)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 192 days.

(21) Appl. No.: 13/731,755

(22) Filed: Dec. 31, 2012

(65) Prior Publication Data

US 2013/0182956 A1      Jul. 18, 2013

(30) Foreign Application Priority Data

Dec. 31, 2011   (CN) .......................... 2011 1 0460431

(51) Int. Cl.
| | |
|---|---|
| *G06K 9/18* | (2006.01) |
| *G06K 9/00* | (2006.01) |
| *G06K 9/22* | (2006.01) |
| *G06F 3/01* | (2006.01) |
| *G06F 3/0488* | (2013.01) |

(52) U.S. Cl.
CPC .............. *G06K 9/22* (2013.01); *G06K 9/00865* (2013.01); *G06F 3/018* (2013.01); *G06F 3/04883* (2013.01)

(58) Field of Classification Search
USPC ........................................ 382/185, 187–189
See application file for complete search history.

(56) References Cited

U.S. PATENT DOCUMENTS

| | | | | |
|---|---|---|---|---|
| 4,718,103 | A * | 1/1988 | Shojima et al. ............... | 382/189 |
| 5,438,631 | A * | 8/1995 | Dai ............................... | 382/197 |
| 6,330,358 | B1 * | 12/2001 | Nagaishi ....................... | 382/178 |
| 6,956,968 | B1 * | 10/2005 | O'Dell et al. ................. | 382/182 |
| 8,054,971 | B2 * | 11/2011 | Weiner .......................... | 380/247 |
| 2004/0120583 | A1 * | 6/2004 | Zhai .............................. | 382/229 |
| 2011/0298807 | A1 * | 12/2011 | Kim .............................. | 345/442 |
| 2012/0263381 | A1 * | 10/2012 | Yoshida ........................ | 382/189 |

OTHER PUBLICATIONS

"Photoshop 101: How to Use the Free Transform Tool" by Niki Brown, Jul. 29, 2009. http://designreviver.com/tutorials/photoshop-101-how-to-use-the-free-transform-tool/.*

"Photoshop Pen Tool Guide" by David Leggett in Photoshop Tutorials on Jan. 15, 2008. http://www.tutorial9.net/tutorials/photoshop-tutorials/pen-tool-basics-in-photoshop/.*

* cited by examiner

*Primary Examiner* — Uptal Shah

(74) *Attorney, Agent, or Firm* — Finnegan, Henderson, Farabow, Garrett & Dunner, LLP

(57) ABSTRACT

A method for processing handwriting input includes determining a first boundary point and a second boundary point corresponding to each target track point, forming an enclosed area by connecting all first boundary points determined for all target track points, connecting all second boundary points determined for all the target track points, connecting the first boundary point corresponding to the first target track point with the second boundary point corresponding to the first target track point, and connecting the first boundary point corresponding to the last target track point with the second boundary points corresponding to the last target track point, and filling the enclosed area.

20 Claims, 9 Drawing Sheets

METHODS AND DEVICES FOR PROCESSING HANDWRITING INPUT

RELATED APPLICATIONS

This application is based upon and claims the benefit of priority from Chinese Patent Application No. 201110460431.2, filed Dec. 31, 2011, the entire contents of which are incorporated herein by reference.

TECHNICAL FIELD

The present invention relates to the field of computer technology, and particularly relates to methods and devices for processing handwriting input.

BACKGROUND

With the development of computer technology, electronic devices such as PC (Personal Computer), mobile phone, Tablet, PDA (Personal Digital Assistant), or the like, have been widely used. Through the interface provided by an electronic device, a user may write desired Chinese characters on the screen of the electronic device using an input device (e.g., keyboard, touch screen, mouse, stylus, etc.). Methods for Chinese character input may include keyboard input and handwriting input. In the keyboard input, a user may enter Pinyin or Chinese character root via the peripheral keyboard or keyboard set in the touch screen, and the character recognition function of the electronic device converts the entered Chinese character into standard printed Chinese character fonts (e.g., Song, Kai, etc.). The input Chinese characters are then displayed. In the handwriting input, a user may enter desired Chinese characters in the region set on a touch screen, and the character recognition function of the electronic device would convert the desired Chinese characters into printed Chinese character fonts, and the electronic device would display the input Chinese characters on the screen.

In every existing Chinese character input method, the user's input of Chinese characters are converted by the character recognition function of the electronic device into standard printed Chinese character fonts to be displayed, rather than being displayed as handwritten Chinese characters handwritten by the user. Handwritten Chinese characters, however, are more flexible, unique and original than the printed Chinese characters. Especially in the development of personal mobile e-commerce, a user's handwriting is desirable, for example, as a personal electronic signature to conduct e-commerce activities.

Currently, the electronic format of the personal handwritten Chinese characters is generally obtained by firstly handwriting Chinese characters on paper, and then converting them into electronic format by scanning or the like for subsequent applications. Such an approach may be time-consuming; moreover, the electronic format of the handwritten Chinese characters obtained by scanning and etc. may be prone to have noise points. Therefore, methods to process handwritten Chinese character input on electronic devices to get an electronic format of the handwritten Chinese characters are of interest.

SUMMARY

Methods and devices are disclosed for processing handwriting input to process the handwritten Chinese character input on electronic devices. Consistent with one embodiment, a method for processing handwriting input may include the following steps: determining a first boundary point and a second boundary point corresponding to each target track point, wherein the first boundary point is located on one side of its corresponding target track point, and the second boundary point is located on the other side of its corresponding target track point; forming an enclosed area by connecting successively all first boundary points determined for all target track points, connecting successively all second boundary points determined for all the target track points, connecting the first boundary point corresponding to the first target track point with the second boundary point corresponding to the first target track point, and connecting the first boundary point corresponding to the last target track point with the second boundary point corresponding to the last target track point; and filling the enclosed area.

Consistent with some embodiments, a method for processing handwriting input may perform processes including the following steps: determining a boundary point corresponding to each target track point, wherein all boundary points determined for all target track points are located on the same side of the target track points; forming an enclosed area by connecting successively all the boundary points determined for all the target track points, connecting successively all the target track points, connecting the first target track point with its corresponding boundary point, and connecting the last target track point with its corresponding boundary point; and filling the enclosed area.

Consistent with some embodiments, a device for processing handwriting input may include the following: a first determination module for determining a first boundary point and a second boundary point corresponding to each target track point, wherein the first boundary point is located on one side of its corresponding target track point, and the second boundary point is located on the other side of its corresponding target track point; a second determination module for forming an enclosed area by connecting successively all first boundary points determined for all target track points, connecting successively all second boundary points determined for all the target track points, connecting the first boundary point corresponding to the first target track point with the second boundary point corresponding to the first target track point, and connecting the first boundary point corresponding to the last target track point with the second boundary point corresponding to the last target track point; and a filling module for filling the enclosed area.

Consistent with some embodiments, a device for processing handwriting input may include the following: a boundary point determination module for determining a boundary point corresponding to each target track point, wherein all boundary points determined for all target track points are located on the same side of these target track points; an enclosed area determination module for forming an enclosed area by connecting successively all the boundary points determined for all the target track points, connecting successively all the target track points, connecting the first target track point with its corresponding boundary point, and connecting the last target track point with its corresponding boundary point; and an enclosed area filling module for filling the enclosed area.

Consistent with some embodiments, methods and devices are described for determining a first boundary point and a second boundary point corresponding to each received target track point (or determine a boundary point corresponding to each received target track point), successively connecting all first boundary points and second boundary points (or all the boundary points) determined for all target track points to form the outline of the handwriting, and displaying the outline on the screen of an electronic device.

DESCRIPTION OF THE PREFERRED EMBODIMENTS

It is to be understood that the following detailed description is exemplary and explanatory only and is not restrictive of disclosed embodiments. For example, steps or processes disclosed herein are not limited to being performed in the order described, but may be performed in any order, and that some steps may be omitted, consistent with the disclosed embodiments.

Reference will not be made in detail to exemplary embodiments, examples of which are illustrated in the accompanying drawings and disclosed herein. While several exemplary embodiments and features are described herein, modifications, adaptations, and other implementations may be possible, without departing from the spirit and scope of the disclosure. Accordingly, the following detailed description does not limit the disclosure. Instead, the proper scope of the disclosure is defined by the appended claims.

In some embodiments, handwriting input may be performed by dragging the mouse of the electronic device, directly writing on the touch screen, or any other handwriting input method known. For example, if the handwriting input is performed by dragging the mouse, upon dragging the mouse while pressing its operating button, the relevant device may be configured to receive the track points generated by the motion of the mouse. Upon the completion of writing one stroke or the entire character and the releasing of the operating button of the mouse, the device may be configured to stop receiving the track points.

Figure 1:
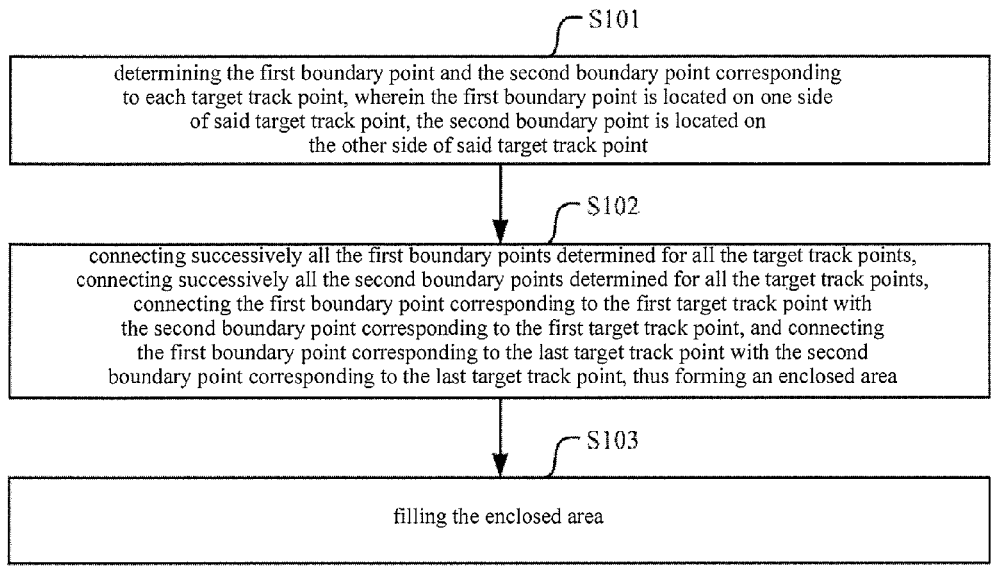
FIG. 1 shows an exemplary flowchart of a method for processing handwriting input consistent with certain disclosed embodiments.

FIG. 1 shows an exemplary first method for performing one or more processes consistent with certain disclosed embodiments. The first method for processing handwriting input may include the following steps: determining a first boundary point and a second boundary point corresponding to each target track point, wherein the first boundary point is located on one side of its corresponding target track point, and the second boundary point is located on the other side of its corresponding target track point (S101); forming an enclosed area by connecting successively all first boundary points determined for all target track points, connecting successively all second boundary points determined for all the target track points, connecting the first boundary point corresponding to the first target track point with the second boundary point corresponding to the first target track point, and connecting the first boundary point corresponding to the last target track point with the second boundary point corresponding to the last target track point (S102); and filling the enclosed area (S103).

In some embodiments, the step of determining a first boundary point and a second boundary point corresponding to each target track point may be performed in real-time. In other embodiments, the step of determining the first boundary point and the second boundary point corresponding to each target track point may be performed upon receiving each stroke including all the target track points. The disclosed embodiments of the present invention are described using the examples of performing the determination in real-time. Other ways of performing the determination may be similarly applied.

In some embodiments, determining a first boundary point and a second boundary point corresponding to each target track point at step S101 may be performed the following two ways.

According to the first approach, the first method may include the steps of: determining a straight line formed by the target track point and its preceding or succeeding target track point; determining a line perpendicular to the straight line through the target track point; setting a first boundary point corresponding to the target track point on the perpendicular line, wherein the first boundary point may be on one side of the target track point, the distance between the first boundary point and the target track point may be set at a first predetermined length; setting a second boundary point corresponding to the target track point on the perpendicular line, wherein the second boundary point may be on the other side of the target track point, the distance between the second boundary point and the target track point may be set at a second pre-determined length.

The first approach of the first method for determining boundary points corresponding to each target track point is further described below with reference to the Figures.

Figure 2:
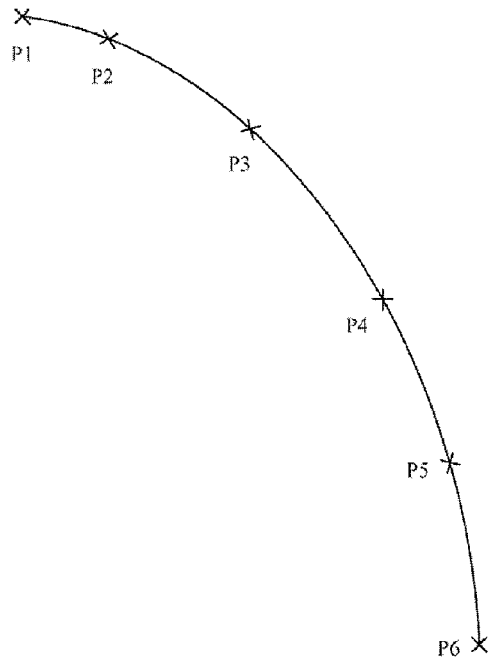
FIG. 2 shows an exemplary diagram of track points of handwriting input consistent with certain disclosed embodiments.
Figure 3A:
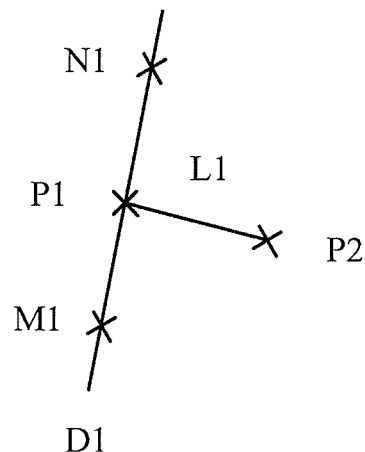
FIG. 3A shows an exemplary view of a method for determining a first boundary point and a second boundary point corresponding to each target track point consistent with certain disclosed embodiments.

In some embodiments, the handwriting input may be performed by dragging the mouse. FIG. 2 shows an exemplary track points generated by the motion of the mouse. As shown in FIG. 2, 6 track points, P1 to P6, may be generated and received. Taking the track points P1 to P6 as target track points, upon receiving the first target track point P1 and the second target track point P2, the first method may perform the steps of: determining a straight line L1 (FIG. 3A) formed by the first target track point P1 and the second target track point P2, the straight line L1 connecting the first target track point P1 and the second target track point P2; determining a perpendicular line D1 (FIG. 3A) to the straight line L1 through the first target track point P1; setting a first boundary point M1 (FIG. 3A) corresponding to the first target track point P1, wherein the first boundary point M1 is located on the perpendicular line D1 and on the left side of the first target track point P1, and has a distance of a first pre-determined length from the first target track point P1; and setting a second boundary point N1 (FIG. 3A) corresponding to the first target track point P1, wherein the second boundary point N1 is located on the perpendicular line D1 and on the right side of the first target track point P1, and has a distance of a second pre-determined length from the first target track point P1. FIG. 3A shows the determined first boundary point M1 and second boundary point N1 corresponding to the first target track point P1.

Figure 3B:
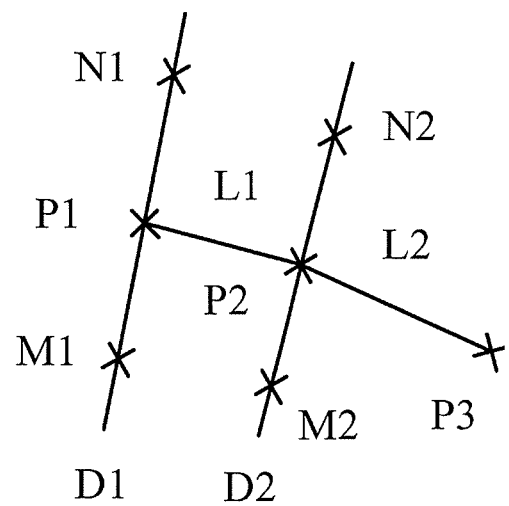
FIG. 3B shows an exemplary view of a method for determining a first boundary point and a second boundary point corresponding to each target track point consistent with certain disclosed embodiments.

Upon receiving the third target track point P3, the first method may perform the steps of: determining a straight line L2 (FIG. 3B) formed by the second target track point P2 and the third target track point P3, the straight line L2 (FIG. 3B) connecting the second track point P2 and the third target track point P3; determining a perpendicular line D2 (FIG. 3B) to the straight line L2 through the second target track point P2; setting a first boundary point M2 (FIG. 3B) corresponding to the second target track point P2, wherein the first boundary point M2 is located on the perpendicular line D2 and on the left side of the second target track point P2, and has a distance of a first pre-determined length from the second target track point P2; and setting a second boundary point N2 (FIG. 3B) corresponding to the target track point P2, wherein the second boundary point N2 is located on the perpendicular line D2 and on the right side of the second target track point P2, and has a distance of a second pre-determined length from the second target track point P2. FIG. 3B shows the determined first boundary point M2 and second boundary point N2 corresponding to the second target track point P2.

Figure 3C:
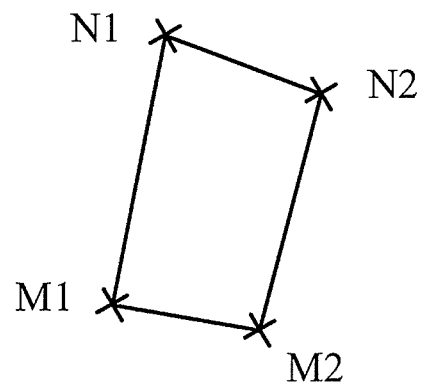
FIG. 3C shows an exemplary view of a method for determining a first boundary point and a second boundary point corresponding to each target track point consistent with certain disclosed embodiments.

In some embodiments, the step S102 may perform the step of forming an enclosed area A1 as shown in FIG. 3C by connecting successively all the determined first boundary points M1 and M2, connecting successively all the determined second boundary points N1 and N2, connecting the first boundary point M1 with the second boundary point N1, and connecting the first boundary point M2 with the second boundary point N2.

Figure 3D:
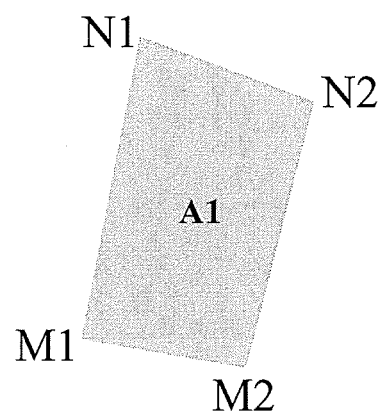
FIG. 3D shows an exemplary view of a method for determining a first boundary point and a second boundary point corresponding to each target track point consistent with certain disclosed embodiments.

In some embodiments, the step S103 may perform the step of filling the enclosed area A1 formed at S102, as shown in FIG. 3D. In some embodiments, the filled enclosed area A1 may be displayed upon the completion of S103.

Figure 3E:
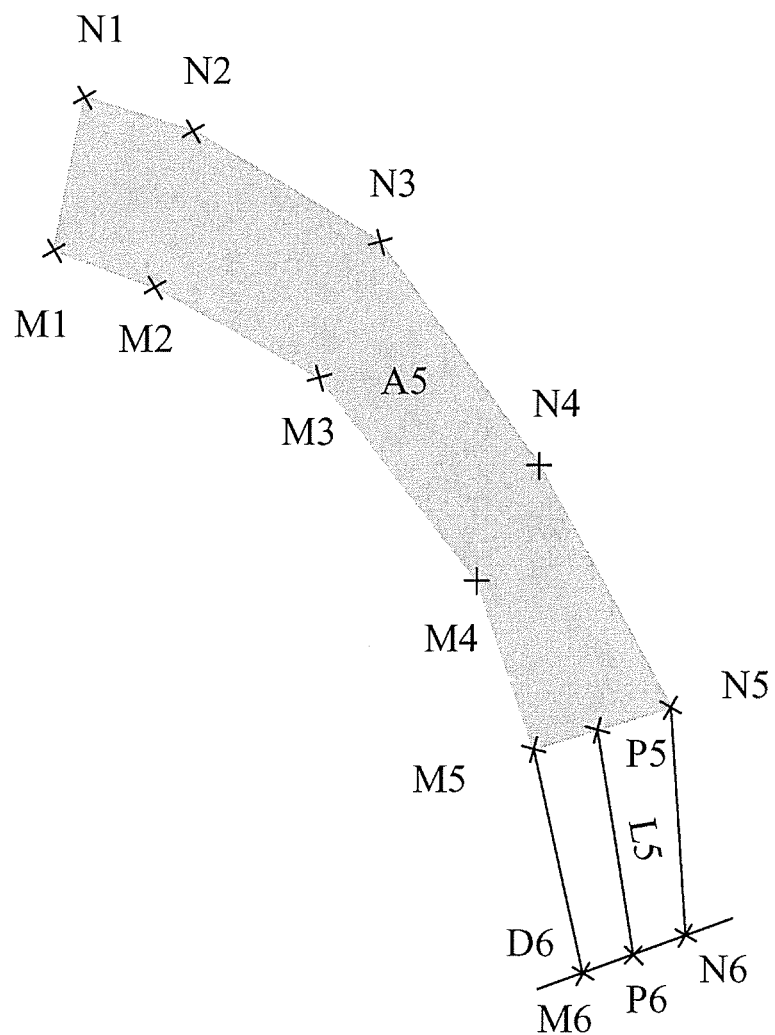
FIG. 3E shows an exemplary view of a method for determining a first boundary point and a second boundary point corresponding to each target track point consistent with certain disclosed embodiments.

Consistent with certain disclosed embodiments, as shown in FIG. 3E, upon receiving the last target track point P6, the first boundary points M1 to M5 and the second boundary points N1 to N5 corresponding to the target track points P1 to P5 have been successively connected, forming the enclosed area A5. In some embodiments, the disclosed first method may include the step of filling the enclosed area A5, replacing the previously formed enclosed area A4 with the newly formed enclosed area A5, and displaying such.

In some embodiments, for the last target track point P6, the first method may include the step of determining a straight line L5 formed by the fifth track point P5 and the last target track point P6, the straight line L5 connecting the fifth track point P5 and the last target track point P6; determining a perpendicular line D6 to the straight line L5 through the last target track point P6; setting a first boundary point M6 corresponding to the last target track point P6 on the perpendicular line D6, wherein the first boundary point M6 is located on the left side of the last target track point P6, and has a distance of a first pre-determined length from the last target track point P6; and setting a second boundary point N6 corresponding to the target track point P6 on the perpendicular line D6, wherein the second boundary point N6 is located on the right side of the last target track point P6, and has a distance of a second pre-determined length from the last target track point P6. FIG. 3E shows the determined first boundary point M6 and second boundary point N6 corresponding to the last target track point P6.

Figure 3F:
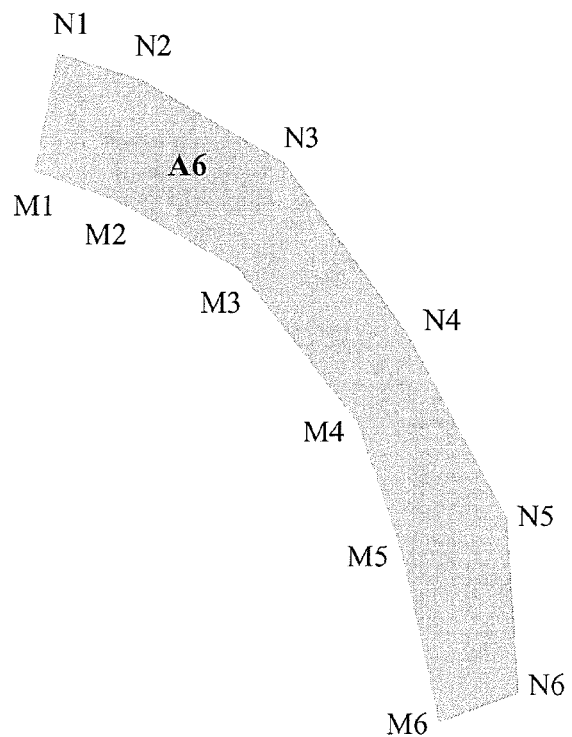
FIG. 3F shows and exemplary view of a method for determining a first boundary point and a second boundary point corresponding to each target track point consistent with certain disclosed embodiments.

Consistent with certain disclosed embodiments, the first boundary points M1 to M6 and the second boundary points N1 to N6 corresponding to all the target track points P1 to P6 have been successively connected, forming an enclosed area A6, as shown in FIG. 3F. In some embodiments, the disclosed first method may include of the step of filling the enclosed area A6, replacing the previously formed enclosed area A5 with the newly formed enclosed area A6, and displaying such.

In some embodiments, the above processes may be repeated until the Chinese character handwriting input is finished.

According to the second approach, for each target track point among all the target track points except for the first target track point and the last target track point (the following description of each target track point regarding the second way does not include the first and the last track points), the disclosed system may form an angle having each of the target track point as the vertex by connecting successively each target track point with its preceding and succeeding target track points.

In some embodiments, the second approach of the first method may include the steps of: setting a first boundary point on the angle bisector line corresponding to each target track point, wherein the first boundary point may be located on one side of its corresponding target track point and has a distance of a first pre-determined length from its corresponding target track point; setting a second boundary point on the angle bisector line, wherein the second boundary point may be located on the other side of its corresponding target track point and has a distance of a second pre-determined length from its corresponding target track point.

In some embodiments, the second approach of the first method may further include that the first boundary point and the second boundary point corresponding to the middle target track point among three adjacent target track points are determined according to the three adjacent target track points, such that the first boundary point and the second boundary point corresponding to each target track point may be much closer to the outline of the handwriting fonts.

In some embodiments, in the second approach, the first boundary point and the second boundary point corresponding to the first target track point may be determined, for example, by determining a straight line formed by the first target track point and its succeeding target track point; determining a perpendicular line to the straight line through the first target track point; setting a first boundary point corresponding to the first target track point on the perpendicular line, wherein the first boundary point may be located on one side of the first target track point, and may have a distance of a first pre-determined length from the first target track point; and setting a second boundary point corresponding to the first target track point on the perpendicular line, wherein the second boundary point may be located on the other side of the first target track point, and may have a distance of a second pre-determined length from the first target track point.

In some embodiments, in the second approach, the first boundary point and the second boundary point corresponding to the last target track point may be determined by, for example, determining a straight line formed by the last target track point and its preceding target track point; determining a perpendicular line to the straight line through the last target track point; setting a first boundary point corresponding to the last target track point on the perpendicular line, wherein the first boundary point may be located on one side of the last target track point, and may have a distance of a first pre-determined length from the last target track point; and setting a second boundary point corresponding to the target track point on the perpendicular line, wherein the second boundary point may be located on the other side of the last target track point, and may have a distance of a second pre-determined length from the last target track point.

Referring back to FIG. 2 as an example, the second approach of determining the first boundary point and the second boundary point corresponding to each target track point according to the disclosed embodiments of the invention is further explained below. Considering the track points P1-P6 as the target track points, for the first target track point P1, upon receiving the second target track point P2, the first method may perform processes including, for example, determining the first boundary point M1 and the second boundary point N1 corresponding to the first target track point P1 based on the received first target track point P1 and the second target track point P2 consistent with the disclosed embodiments, as shown in FIGS. 3A and 3B.

Figure 4:
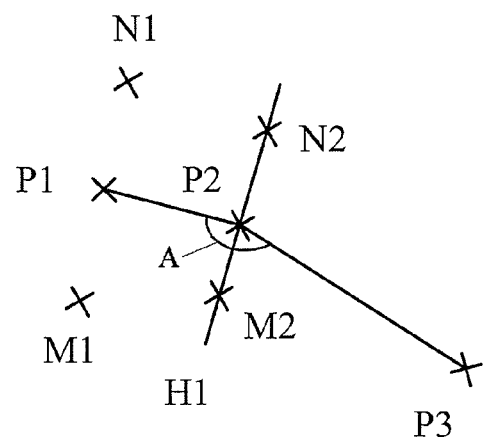
FIG. 4 shows an exemplary method for determining a first boundary point and a second boundary point corresponding to each target track point consistent with certain disclosed embodiments.

Upon receiving the third target track point P3, the disclosed first method may include the step of successively connecting the first target track point P1, the second target track point P2, and the third target track point P3; determining an angle having the second target track point P2 as the vertex; determining the angle bisector line H1 (FIG. 4); setting a first boundary point M2 corresponding to the second target track point P2 on the angle bisector line H1, wherein the first boundary point M2 is located on the left side of the second target track point P2, and has a distance of a first pre-determined length from the second target track point P2; setting a second boundary point N2 corresponding to the second target track point P2 on the angle bisector line, wherein the second boundary point N2 is located on the right side of the second target track point P2, and has a distance of a second pre-determined length from the second target track point P2. FIG. 4 shows the determined first boundary point M2 and second boundary point N2 corresponding to the second target track point P2. The same processes may be performed for determining the first boundary points and the second boundary points corresponding to other target track points.

In some embodiments, for the last target track point P6, the disclosed first method may perform processes including, for example, determining a first boundary point M6 and a second boundary point N6 corresponding to the last target track point P6 based on the received fifth target track point P5 and the last target track point P6 consistent with certain disclosed embodiments.

Above-discussed processes may be repeatedly performed until the Chinese character handwriting input is finished. The first pre-determined length and the second pre-determined length set in both the first approach and the second approach may be equal.

In some embodiments, the first pre-determined length and the second pre-determined length may be determined based on experienced value and may be set based on needs. In some embodiments, the first length and the second length may be determined respectively according to the distance between a target track point and its preceding target track point. Specifically, based on experiences, a first function relationship between the first length and the distance between a target track point and its preceding target track point and a second function relationship between the second length and the distance between a target track point and its preceding target track point may be determined respectively; and based on experiences, the initial values of the first function relationship and the second function relationship may be set respectively; the initial values of the first function relationship and the second function relationship may be used as the first length and the second length corresponding to the first target track point.

For any target track point except for the first target track point, if the distance between a target track point and its preceding target track point is longer, the first length and the second length corresponding to the target track point determined on the basis of the first function relationship and the second function relationship may become shorter. And if the distance between a target track point and its preceding target track point is shorter, the first length and the second length corresponding to the target track point determined on the basis of the first function relationship and the second function relationship may become longer, i.e. there may be an inversely proportional relationship between the first function and the second function. Therefore, when the movement speed of the mouse is fast, the received outline formed by the determined first boundary point and the second boundary point may be thin, whereas when the movement speed of the mouse is slow, the received outline formed by the determined first boundary point and the second boundary point may be thick. Accordingly, an analog handwritten Chinese character may be rendered more real, so as to be displayed on the screen.

The specific calculation sequence consistent with certain disclosed embodiments is discussed below. In some embodiments, as shown in FIG. 4, the degree of angle A having the target track point P2 as the vertex may be calculated according to the coordinates of the target track points P1, P2, P3 using the relationship between the triangular angle cosine and the length of three sides of the triangle. The degree of angle a, which is the half angle of angle A, may be further obtained using the formula $a=A/2$. The coordinates of the first boundary point M1 and the second boundary point N1 may be calculated by the rotation of the vector, wherein the vector P2P1 may be rotated by a degree a and doubled in length into a vector P2M1, accordingly the coordinates of point M1 may be calculated by establishing equations; the point N1 may be calculated in a similar manner. It should be understood that the direction of rotating the vector P2P1, in a clockwise or counterclockwise, may be determined by comparing the coordinate positions of points P1 and P3.

In some embodiments, to accelerate the processing speed and improve the processing efficiency, before the step S101 (FIG. 1), the disclosed first method for processing handwriting input may further perform the step of determining a target track point according to the received distance between the adjacent track points, such that the distance between two adjacent target track points is larger than a preset threshold value, which is a value that may be determined based on experience and needs.

Specifically, the disclosed first method may include the steps of: considering the first received track point as the first target track point, upon receiving the second track point, determining whether the distance between the second track point and the first target track point is greater than the preset threshold value; if the distance between the second track point and the first target track point is greater than the preset threshold value, determining the received second track point as the second target track point; and determining whether the received third track point is the target track point on the basis of the distance between the determined second target track point and the currently received third track point. The same processes may be performed for determining other target track points consistent with certain disclosed embodiments.

The disclosed first method may further include the steps of: if the distance between the second track point and the first target track point is not greater than the preset threshold value, ignoring the second track point, and determining whether the distance between the currently received third track point and the determined first target track point is greater than the threshold value. If so, determining the currently received third track point as the target track point, i.e. the second target track point. The disclosed first method may also further perform the step of determining whether the currently received fourth track point is the target track point on the basis of the distance between the determined second target track point and the currently received fourth track point. The same processes may be performed for determining other target track points consistent with certain disclosed embodiments.

The disclosed first method may further include the steps of: if the distance between the third track point and the second target track point is not greater than the preset threshold value, ignoring the third track point, and determining whether the distance between the currently received fourth track point and the determined first target track point is greater than the preset threshold value, so as to determine whether the currently received fourth track point is the target track point. The same processes may be performed for determining other target track points consistent with the disclosed embodiments.

In some embodiments, upon the completion of writing each stroke of the Chinese character (e.g., upon the releasing of the operating button of the mouse), the disclosed first method for processing handwriting input may further perform processes including the following steps between S102 (FIG. 1) and S103 (FIG. 1).

The disclosed first method for processing handwriting input may further perform a smoothing process on all the coordinates sequence of the first boundary points and the second boundary points constituting the enclosed area.

Figure 5A:
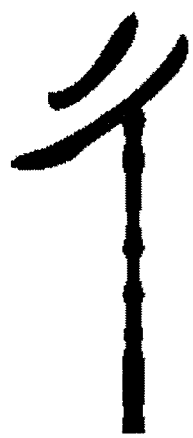
FIG. 5A shows an exemplary view of the handwriting font without performing smoothing process.
Figure 5B:
FIG. 5B shows an exemplary view of the handwriting font after performing smoothing process consistent with certain disclosed embodiments.

Specifically, FIG. 5A shows an exemplary view of the handwriting font without performing smoothing process. In some embodiments, the disclosed first method may adopt the method of minimizing errors by fitting the outline shape of the enclosed area shown in FIG. 5A using Bezier curves, to cause the errors fall within a preset range. As shown in FIG. 5B, the handwritten Chinese character outline after the smoothing process looks smoother and has an elegant appearance.

The disclosed first method for processing handwriting input may also perform a cross-removing process on the determined enclosed area, obtaining the screen bitmap, and obtaining the boundary information of the outline of the handwritten Chinese character based on the obtained screen bitmap.

Figure 6A:
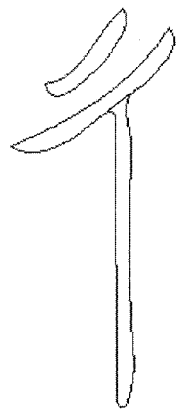
FIG. 6A shows an exemplary outline of the handwriting font without performing cross-removing process.
Figure 6B:
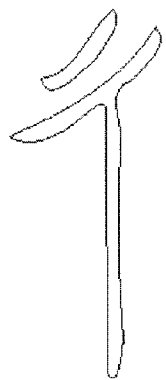
FIG. 6B shows an exemplary outline of the handwriting font after performing cross-removing process consistent with certain disclosed embodiments.

Specifically, as shown in FIG. 6A, cross-removing processing may be performed on the outline portion where the second left-falling stroke crosses the vertical stroke, to achieve the outline shown in FIG. 6B. The process may also include the step of obtaining the screen bitmap of the handwritten Chinese character, and further obtaining the boundary information data of the outline of the handwritten Chinese character based on the obtained bitmap, wherein the boundary information data may include the coordinates of each of the first boundary points and the second boundary points.

Consistent with certain disclosed embodiments, a device may be provided for processing handwriting input. In some embodiments, the device may have the same principle as that disclosed in the first method for processing handwriting input as shown in FIG. 1. Thus, the device may be implemented with reference to the method as shown in FIG. 1 and further described in FIGS. 22, 3A-3F, 4, 5A, 5B, 6A and 6B.

Figure 7:
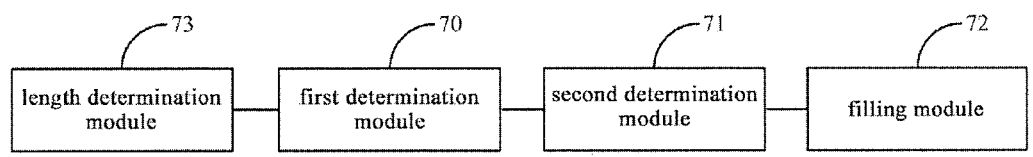
FIG. 7 shows an exemplary configuration of a first device for processing handwriting input consistent with certain disclosed embodiments.

FIG. 7 shows an exemplary first device for processing handwriting input. The first device may include, for example, a first determination module 70 for determining the first boundary point and the second boundary point corresponding to each target track point, wherein the first boundary point is located on one side of its corresponding target track point, and the second boundary point is located on the other side of its corresponding target track point; a second determination module 71 for forming an enclosed area by connecting successively all the first boundary points determined for all the target track points, connecting successively all the second boundary points determined for all the target track points, connecting the first boundary point corresponding to the first target track point with the second boundary point corresponding to the first target track point, and connecting the first boundary point corresponding to the last target track point with the second boundary point corresponding to the last target track point; and a filling module 72 for filling the enclosed area. Modules 70-73 may be implemented by computer instructions executed by one or more computer processors.

In some embodiments, the first determining module 70 may specifically comprise functions including, with respect to an individual target track point, determining a straight line formed by this individual target track point and its preceding or succeeding target track point; determining a line perpendicular to the straight line through the individual target track point; setting a first boundary point corresponding to the individual target track point on the perpendicular line, wherein the first boundary point may be on one side of the individual target track point, the distance between the first boundary point and the individual target track point may be set at a first pre-determined length; setting a second boundary point corresponding to the individual target track point on the perpendicular line, wherein the second boundary point may be located on the other side of the individual target track point, and the distance between the second boundary point and the individual target track point may be set at a second pre-determined length.

In some embodiments, the first determining module 70 may specifically comprise functions including the following: for an individual target track point among all the target track points except for the first target track point and the last target track point, connecting successively the preceding target track point to the individual target track point, the individual target track point, and the subsequent target track point to the individual target track point, to form an angle with the individual track point as the vertex; setting a point located on the angle bisector line, located on one side of the target track point and having a distance of a first pre-determined length from the target track point, as the first boundary point corresponding to the target track point; setting a point located on the angle bisector line, located on the other side of the target track point and having a distance of a second pre-determined length from the target track point, as the second boundary point corresponding to the target track point.

In some embodiments, the first determining module 70 may specifically comprise functions including determining a straight line formed by the first target track point and its succeeding target track point; determining a perpendicular line to the straight line through the first target track point; setting a first boundary point corresponding to the first target track point on the perpendicular line, wherein the first boundary point may be located on one side of the first target track point, and may have a distance of a first pre-determined length from the first target track point; and setting a second boundary point corresponding to the first target track point on the perpendicular line, wherein the second boundary point may be located on the other side of the first target track point, and may have a distance of a second pre-determined length from the first target track point.

In some embodiments, the first determining module 70 may also comprise functions including determining a straight line formed by the last target track point and its preceding target track point; determining a perpendicular line to the straight line through the last target track point; setting a first boundary point corresponding to the last target track point on the perpendicular line, wherein the first boundary point may be located on one side of the last target track point, and may have a distance of a first pre-determined length from the last target track point; and setting a second boundary point corresponding to the last target track point on the perpendicular line, wherein the second boundary point may be located on the other side of the last target track point, and may have a distance of a second pre-determined length from the last target track point.

The first pre-determined length and the second pre-determined length may be equal.

In some embodiments, the first device for processing handwriting input as shown in FIG. 7, may further include a length determination module 73 for determining the first length and the second length respectively according to the distance between a target track point and the its preceding target track point.

The distance between two adjacent target track points may be larger than a preset threshold value.

Figure 8:
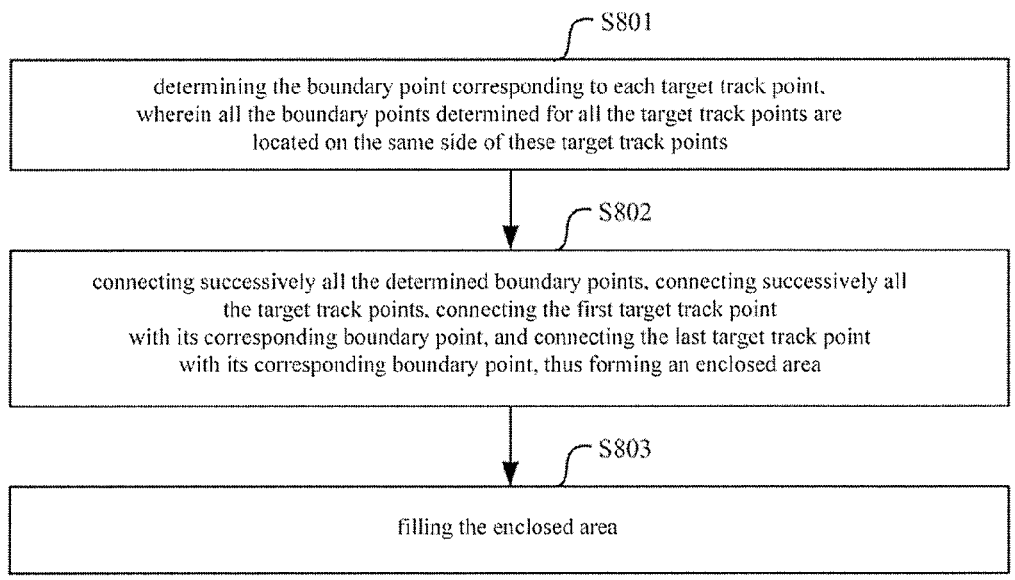
FIG. 8 shows an exemplary flowchart of a method for processing handwriting input consistent with certain disclosed embodiments.

FIG. 8 shows an exemplary second method for processing handwriting input. In some embodiments, the second method may perform processes including the following steps: determining a boundary point corresponding to each target track point, wherein all the boundary points determined for all the target track points are located on the same side of the target track point (S801); forming an enclosed area by connecting successively all the determined boundary points, connecting successively all the target track points, connecting the first target track point with its corresponding boundary point, and connecting the last target track point with its corresponding boundary point, thus forming an enclosed area (S802); and filling the enclosed area (S803).

In some embodiments, the step S801 of determining the boundary point corresponding to each target track point may include the following two approaches.

In some embodiments, the first approach may perform processes including: with respect to an individual target track point, determining a straight line formed by this individual target track point and a target track point preceding or following this individual target track point; determining a line perpendicular to the straight line through the individual target track point, setting a boundary point corresponding to the individual target track point on the perpendicular line, wherein the boundary point may be on one side of the individual target track point, the distance between the boundary point and the individual target track point may be set at a first pre-determined length; or setting a boundary point corresponding to the individual target track point on the perpendicular line, wherein the boundary point may be located on the other side of the individual target track point, the distance between the boundary point and the individual target track point may be set at a second pre-determined length.

In other embodiments, the second way approach may perform processes including: for an individual target track point among all the target track points except for the first target track point and the last target track point, connecting successively the preceding target track point to the individual target track point, the individual target track point, and the subsequent target track point to the individual target track point, to form an angle having the individual track point as the vertex; setting a boundary point on the angle bisector line, wherein the boundary point may be located on one side of the individual target track point and may have a distance of a first pre-determined length from the individual target track point. Additionally or alternatively, the second approach may also perform processes including setting a boundary point on the angle bisector line, wherein the boundary point may be located on the other side of the individual target track point and may have a distance of a second pre-determined length from the individual target track point.

In some embodiments, the second approach of the second method may perform processes for determining the boundary point corresponding to the first target track point. For example, the processes may include determining a straight line formed by the first target track point and its succeeding target track point; determining a perpendicular line to the straight line through the first target track point; setting a boundary point corresponding to the first target track point on the perpendicular line, wherein the boundary point may be located on one side of the first target track point, and may have a distance of a first pre-determined length from the first target track point. Additionally or alternatively, the second approach may also perform processes including setting a boundary point corresponding to the first target track point on the perpendicular line, wherein the boundary point may be located on the other side of the first target track point, and may have a distance of a second pre-determined length from the first target track point.

In some embodiments, the second approach of the second method may perform processes for determining the boundary point corresponding to the last target track point. For example, the processes may include determining a straight line formed by the last target track point and its preceding target track point; determining a perpendicular line to the straight line through the last target track point; setting a boundary point corresponding to the last target track point on the perpendicular line, wherein the boundary point may be located on one side of the last target track point, and may have a distance of a first pre-determined length from the last target track point. Additionally or alternatively, the second way may also perform processes including setting a boundary point corresponding to the last target track point on the perpendicular line, wherein the boundary point may be located on the other side of the last target track point, and may have a distance of a second pre-determined length from the last target track point.

The first method and the second method for processing handwriting input according to the embodiments of the invention are different in that: according to the first method for processing handwriting input, the first boundary point and the second boundary point corresponding to each received target track point may be determined, and then an enclosed area constituted by all the determined first boundary points and all the second boundary points may be determined, such that the outline of the handwritten Chinese character may be formed; whereas according to the second method for processing handwriting input, a boundary point corresponding to each received target track point may be determined, all the boundary points may be located on the same side of the target track points, and an enclosed area constituted by all the determined boundary points and all the target track points may be determined, such that the outline of the handwritten Chinese character may be formed.

The first pre-determined length may be equal to the second pre-determined length.

The first and second lengths may be determined as follows according to an embodiment of the invention: determining the first and second lengths respectively according to the distance between a target track point and its preceding target track point, the details of which have been described in the determining process of the first and second lengths in the first method for processing handwriting input with reference to FIG. 1, and will be omitted here.

According to some disclosed embodiments, the distance between two adjacent target track points is larger than a preset threshold value. The determination of the target track point has been described in the determining process in the first method for processing handwriting input with reference to FIG. 1, and will be omitted here.

Consistent with certain disclosed embodiments, some embodiments of the present invention may also provide a second device for processing handwriting input. The second device may have the same principle as the second method for processing handwriting input as shown in FIG. 8. Thus the second device may be implemented with reference to the method as shown in FIG. 8.

Figure 9:
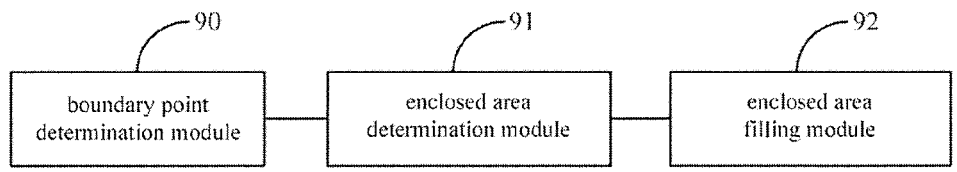
FIG. 9 shows an exemplary configuration of a second device for processing handwriting input consistent with certain disclosed embodiments.

FIG. 9 shows an exemplary second device for processing handwriting input. In some embodiments, the second device for processing handwriting input may include, for example, a boundary point determination module 90 for determining a boundary point corresponding to each target track point, wherein all the boundary points determined for all the target track points are located on the same side of these target track points; an enclosed area determination module 91 for forming an enclosed area by connecting successively all the determined boundary points, connecting successively all the target track points, connecting the first target track point with its corresponding boundary point, and connecting the last target track point with its corresponding boundary point; and an enclosed area filling module 92 for filling the enclosed area.

In some embodiments, the first determining module 90 may specifically comprise functions including, for example, with respect to an individual target track point, determining a straight line formed by this individual target track point and a target track point preceding or following this individual target track point; determining a line perpendicular to the straight line through the individual target track point; setting a boundary point corresponding to the individual target track point on the perpendicular line, wherein the boundary point may be on one side of the individual target track point, the distance between the boundary point and the individual target track point may be set at a first pre-determined length. Additionally or alternatively, the first determining module 90 may also perform processes of setting a boundary point corresponding to the individual target track point on the perpendicular line, wherein the boundary point may be located on the other side of the individual target track point, the distance between the boundary point and the individual target track point may be set at a second pre-determined length.

In some embodiments, the first determining module 90 may specifically comprise functions including, for example, for an individual target track point among all the target track points except for the first target track point and the last target track point, connecting successively the preceding target track point to the individual target track point, the individual target track point, and the subsequent target track point to the individual target track point, to form an angle having the individual track point as the vertex; setting a boundary point on the angle bisector line, the boundary point may be located on one side of the individual target track point and may have a distance of a first pre-determined length from the individual target track point. Additionally or alternatively, the first determining module 90 may also perform processes including setting a boundary point on the angle bisector line, wherein the boundary point may be located on the other side of the individual target track point and may have a distance of a second pre-determined length from the individual target track point.

In some embodiments, the first determining module 90 may specifically comprise functions including, for example, for the first target track point, determining a straight line formed by the first target track point and its succeeding target track point; determining a perpendicular line to the straight line through the first target track point; setting a boundary point corresponding to the first target track point on the perpendicular line, wherein the boundary point may be located on one side of the first target track point, and may have a distance of a first pre-determined length from the first target track point. Additionally or alternatively, the first determining module 90 may also perform processes including setting a boundary point corresponding to the first target track point on the perpendicular line, wherein the boundary point may be located on the other side of the first target track point, and may have a distance of a second pre-determined length from the first target track point.

In some embodiments, the first determining module 90 may specifically comprise functions including, for example, for the last target track point, determining a straight line formed by the last target track point and its preceding target track point; determining a perpendicular line to the straight line through the last target track point; setting a boundary point corresponding to the last target track point on the perpendicular line, wherein the boundary point may be located on one side of the last target track point, and may have a distance of a first pre-determined length from the last target track point. Additionally or alternatively, the first determining module 90 may also perform processes including setting a boundary point corresponding to the last target track point on the perpendicular line, wherein the boundary point may be located on the other side of the last target track point, and may have a distance of a second pre-determined length from the last target track point.

The first pre-determined length may be equal to the second pre-determined length according to some embodiments of the present disclosure.

The first and second lengths may be determined as follows according to some embodiments of the invention: determining the first and second lengths respectively according to the distance between the target track point and its preceding target track point.

The distance between two adjacent target track points is larger than a preset threshold value according to some embodiments of the present invention.

Hereinafter, the third method for processing handwriting input by dragging the mouse to input handwritten Chinese character on the computer screen is described in detail.

Figure 10:
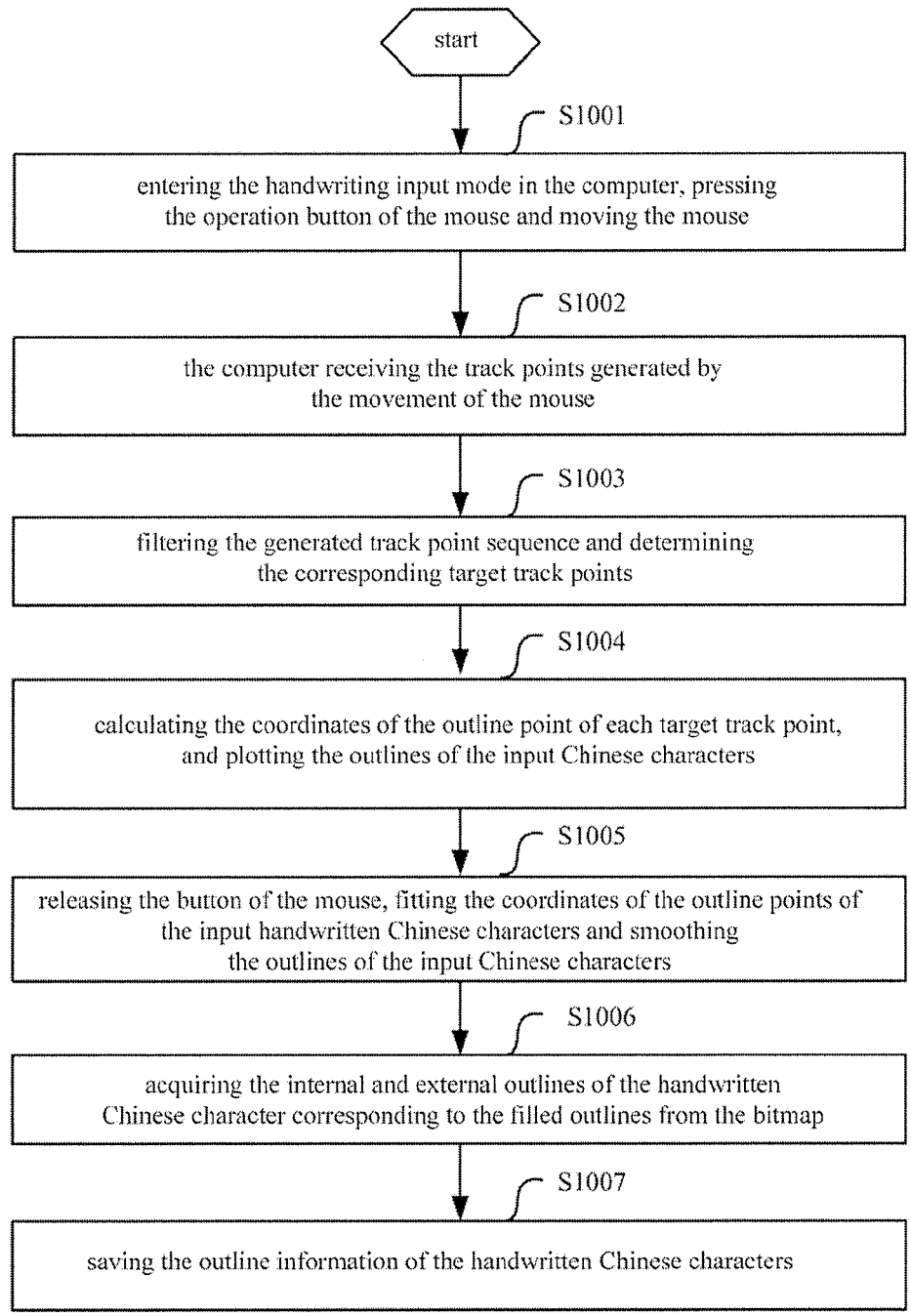
FIG. 10 shows an exemplary configuration of a third device for processing handwriting input consistent with certain disclosed embodiments.

FIG. 10 shows an exemplary third method for processing handwriting input according to some embodiments of the present invention. In some embodiments, the third method may perform processes including, for example, the following steps: entering the handwriting input mode in the computer, pressing the operation button of the mouse and moving the mouse (S1001); the computer receiving the track points generated by the movement of the mouse (S1002); filtering the generated track point sequence and determining the corresponding target track points (S1003); calculating the coordinates of the outline point (i.e. the determined first and second boundary points) of each target track point, and plotting the outlines of the input Chinese characters (i.e. determining the enclosed area constituted by the determined first and second boundary points) (S1004); releasing the button of the mouse, fitting the coordinates of the outline points of the input handwritten Chinese characters and smoothing the outlines of the input Chinese characters (S1005); acquiring the Internal and external outlines of the handwritten Chinese character corresponding to the filled outlines from the bitmap (S1006); and saving the outline information of the handwritten Chinese characters (S1007).

Although certain embodiments of the present disclosure have been described, other variations or modifications are apparent to people skilled in the art once understanding the basic inventive concept. Therefore the scope of the appended claims is intended to be interpreted as covering all the preferred embodiments as well as possible variations or modifications that fall within the present invention.

Consistent with certain embodiments, the third method further includes determining the first boundary point and the second boundary point of the received target track point (or determine the boundary point of the received target track point), and successively connect all the first boundary points and the second boundary points (or all the boundary points) to form the outline of the handwriting, and display on the screen. According to some embodiments of the present disclosure, the outline of the handwritten calligraphy written on the screen using the mouse can be obtained accurately and easily, so as to avoid the need of handwriting Chinese characters on paper first, and then scanning the handwritten Chinese characters handwritten on paper into the form of electronic images. The data amount of the scanned format of images is large, whereas the embodiments of the present invention use the track of the mouse to simulate the outline of the handwritten Chinese character, thus the outline information of the handwritten Chinese character can be obtained directly on the screen and stored with little data amount, and the noise points and error caused during the scanning may be reduced. The plotted handwritten Chinese character according to some embodiments of the present invention may be elegant and may preserve the uniqueness of each person's handwriting.

The present invention can be varied and modified by one skilled in the art without departing from the spirit and scope of the present invention. These variations or modifications fall within the scope of the appended claims and their equivalents. The present invention is intended to cover all these variations or modifications.

What is claimed is:

1. A method for processing handwriting input, comprising:
   determining, for each of a plurality of target track points of a handwriting received by a computer interface, a first boundary point and a second boundary point by a computing device, wherein the first boundary point is located on one side of its corresponding target track point, and the second boundary point is located on the other side of its corresponding target track point, wherein the first boundary point has a distance of a first length from its corresponding target track point, and the second boundary point has a distance of a second length from its corresponding target track point; and
   forming an enclosed area by:
      connecting all first boundary points;
      connecting all second boundary points;
      connecting the first boundary point corresponding to a first target track point with the second boundary point corresponding to the first target track point; and
      connecting the first boundary point corresponding to a last target track point with the second boundary point corresponding to the last target track point.

2. The method of claim 1, wherein the step of determining the first boundary point and the second boundary point further comprises:
   determining a straight line formed by connecting each target track point and its preceding or succeeding target track point;
   determining a line perpendicular to the straight line through each target track point;
   setting the first boundary point on the perpendicular line corresponding to each target track point; and
   setting the second boundary point on the perpendicular line corresponding to each target track point.

3. The method of claim 1, wherein the step of determining a first boundary point and a second boundary point further comprises:
   for any target track point except for the first target track point and the last target track point, connecting a target track point with its preceding and succeeding target track points, and determining an angle having the target track point as the vertex;
   setting the first boundary point on an angle bisector line; and
   setting the second boundary point on the angle bisector line.

4. The method of claim 3, wherein the first boundary point and the second boundary point corresponding to the first target track point are determined by:
   determining a straight line formed by connecting the first target track point and its succeeding target track point;
   determining a line perpendicular to the straight line through the first target track point;
   setting the first boundary point corresponding to the first target track point on the perpendicular line, wherein the first boundary point is located on one side of the first target track point, and has a distance of a first length from the first target track point; and
   setting the second boundary point corresponding to the first target track point on the perpendicular line, wherein the second boundary point is located on the other side of the first target track point, and has a distance of a second length from the first target track point.

5. The method of claim 3, wherein the first boundary point and the second boundary point corresponding to the last target track point are determined by:
   determining a straight line formed by connecting the last target track point and its preceding target track point;
   determining a line perpendicular to the straight line through the last target track point;
   setting the first boundary point corresponding to the last target track point on the perpendicular line, wherein the first boundary point is located on one side of the last target track point, and has a distance of a first length from the last target track point; and
   setting the second boundary point corresponding to the last target track point on the perpendicular line, wherein the second boundary point is located on the other side of the last target track point, and has a distance of a second length from the last target track point.

6. The method of claim 1, wherein the first length and the second length are equal.

7. The method of claim 1, wherein the first length and the second length are determined according to the distance between a target track point and its preceding target track point.

8. The method of claim 1, wherein a distance between two adjacent target track points is larger than a preset threshold value.

9. A method for processing handwriting input processing, comprising:
   determining, for each of a plurality of target track points of a handwriting received by a computer interface, a boundary point by a computing device, wherein all boundary points determined for respective target track points are located on one side of these target track points wherein the boundary point has a distance of a first length from its corresponding target track point; and
   forming an enclosed area by:
      connecting all the boundary points determined for;
      connecting all the target track points;
      connecting a first target track point with its corresponding boundary point; and
      connecting a last target track point with its corresponding boundary point.

10. The method of claim 9, wherein the step of determining a boundary point corresponding to each target track point further comprises:
    determining a straight line formed by connecting each target track point and its preceding or succeeding target track point;
    determining a line perpendicular to the straight line through each target track point;
    setting a boundary point on the perpendicular line corresponding to each target track point, wherein the boundary point is located on one side of its corresponding target track point and has a distance of a first length from its corresponding target track point, or is located on the other side of its corresponding target track point and having a distance of a second length from its corresponding target track point.

11. The method of claim 9, wherein the step of determining the boundary point corresponding to each target track point, except for the first target track point and the last target track point, further comprises:
    connecting a target track point with its preceding and succeeding target track points, and determining an angle having the target track point as the vertex;
    setting the boundary point on an angle bisector line of the angle, wherein the boundary point is located on one side of the target track point and has a distance of a first length from the target track point, or is located on the other side of the target track point and has a distance of a second length from the target track point.

12. The method of claim 11, wherein the boundary point corresponding to the first target track point is determined by:
    determining a straight line formed by connecting the first target track point and its succeeding target track point;
    determining a line perpendicular to the straight line through the first target track point;
    setting the boundary point on the perpendicular line, wherein the boundary point is located on one side of the first target track point and has a distance of a first length from the first target track point, or is located on the other side of the first target track point and has a distance of a second length from the first target track point.

13. The method of claim 11, wherein the boundary point corresponding to the last target track point is determined by:
    determining a straight line formed by connecting the last target track point and its preceding target track point;
    determining a line perpendicular to the straight line through the last target track point;
    setting the boundary point on the perpendicular line, wherein the boundary point is located on one side of the last target track point and has a distance of a first length from the last target track point, or is located on the other side of the last target track point and has a distance of a second length from the last target track point.

14. A device for processing handwriting input, comprising:
    a processor;
    a storage device storing:
       a first determination module for determining, for each of a plurality of target track points of a handwriting received by a computer interface, a first boundary point and a second boundary point, wherein the first boundary point is located on one side of its corresponding target track point, and the second boundary point is located on the other side of its corresponding target track point;
       wherein the first boundary point has a distance of a first length from its corresponding target track point, and the second boundary point has a distance of a second length from its corresponding target track point, the first length and the second length are determined according to the distance between a target track point and its preceding target track point; and
       a second determination module for forming an enclosed area by:
          connecting all first boundary points;
          connecting all second boundary points;
          connecting the first boundary point corresponding to a first target track point with the second boundary point corresponding to the first target track point; and
          connecting the first boundary point corresponding to a last target track point with the second boundary point corresponding to the last target track point.

15. The device of claim 14, wherein the first determination module further comprises:
    determining a straight line formed by connecting each target track point and its preceding or succeeding target track point;
    determining a line perpendicular to the straight line through each target track point;
    setting the first boundary point on the perpendicular line corresponding to each target track point, wherein the first boundary point is located on one side of its corresponding target track point; and setting the second boundary point on the perpendicular line corresponding to each target track point, wherein the second boundary point is located on the other side of its corresponding target track point.

16. The device of claim 14, wherein the first determination module further comprises:

for any target track point except for the first target track point and the last target track point, connecting a target track point with its preceding and succeeding target track points, and determining an angle having the target track point as the vertex;

setting the first boundary point on an angle bisector line, wherein the first boundary point is located on one side of the target track point and has a distance of a first length from the target track point; and setting the second boundary point on the angle bisector line, wherein the second boundary point is located on the other side of the target track point and has a distance of a second length from the target track point.

17. The device of claim 16, wherein the first determination module further comprises one or more sub-modules for:

for the first target track point:

determining a straight line formed by connecting the first target track point and its succeeding target track point;

determining a line perpendicular to the straight line through the first target track point;

setting the first boundary point corresponding to the first target track point on the perpendicular line, wherein the first boundary point is located on one side of the first target track point, and has a distance of a first length from the first target track point; and setting the second boundary point corresponding to the first target track point on the perpendicular line, wherein the second boundary point is located on the other side of the first target track point, and has a distance of a second length from the first target track point;

for the last target track point:

determining a straight line formed by connecting the last target track point and its preceding target track point;

making a line perpendicular to the straight line through the last target track point;

setting the first boundary point corresponding to the last target track point on the perpendicular line, wherein the first boundary point is located on one side of the last target track point, and has a distance of a first length from the last target track point; and setting the second boundary point corresponding to the last target track point on the perpendicular line, wherein the second boundary point is located on the other side of the last target track point, and has a distance of a second length from the last target track point.

18. A non-transitory computer-readable medium storing instructions that, when executed by a processor, cause a computing device to perform operations comprising:

determining, for each of a plurality of target track points of a handwriting received by a computer interface, a first boundary point and a second boundary point, wherein the first boundary point is located on one side of its corresponding target track point, and the second boundary point is located on the other side of its corresponding target track point; wherein the first boundary point has a distance of a first length from its corresponding target track point, and the second boundary point has a distance of a second length from its corresponding target track point, the first length and the second length are determined according to the distance between a target track point and its preceding target track point; and forming an enclosed area by:

connecting all first boundary points determined for respective target track points;

connecting all second boundary points determined for respective target track points;

connecting the first boundary point corresponding to a first target track point and the second boundary point corresponding to the first target track point; and connecting the first boundary point corresponding to a last target track point and the second boundary point corresponding to the last target track point.

19. The method of claim 7, wherein the first length and the second length are inversely proportional to the distance between a target track point and its preceding target track point.

20. The method of claim 9, wherein the first length is inversely proportional to the distance between a target track point and its preceding target track point.

* * * * *